US006733120B2

United States Patent
Ogasawara et al.

(12) 
(10) Patent No.: US 6,733,120 B2
(45) Date of Patent: May 11, 2004

(54) INK SET FOR INK-JET RECORDING, RECORDING METHOD, INK CARTRIDGE, RECORDING UNIT, AND INK-JET RECORDING APPARATUS

(75) Inventors: Masashi Ogasawara, Tokyo (JP); Shinichi Tochihara, Kanagawa (JP); Katsuhiko Takahashi, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 10/167,659

(22) Filed: Jun. 13, 2002

(65) Prior Publication Data

US 2003/0146962 A1 Aug. 7, 2003

(30) Foreign Application Priority Data

Jun. 15, 2001 (JP) ........................................ 2001-181705

(51) Int. Cl.[7] .................................................. B41J 2/01
(52) U.S. Cl. ...................... 347/100; 347/95; 106/31.13; 106/31.6
(58) Field of Search ................................. 347/100, 101, 347/96, 95; 106/31.13, 31.6, 31.27, 31.28

(56) References Cited

U.S. PATENT DOCUMENTS

| | | | |
|---|---|---|---|
| 5,485,188 A | * 1/1996 | Tochihara et al. | 347/100 |
| 5,614,007 A | 3/1997 | Kurabayashi et al. | 106/22 |
| 5,700,314 A | 12/1997 | Kurbayashi et al. | 106/31.27 |
| 5,835,116 A | 11/1998 | Sato et al. | 347/98 |
| 6,003,987 A | 12/1999 | Yamamoto et al. | 347/100 |
| 6,033,463 A | * 3/2000 | Yui et al. | 106/31.27 |
| 6,036,759 A | * 3/2000 | Wickramanayake et al. | 106/31.28 |
| 6,050,676 A | 4/2000 | Sugimoto et al. | 347/43 |
| 6,084,604 A | 7/2000 | Moriyama et al. | 347/15 |
| 6,238,045 B1 | 5/2001 | Ono et al. | 347/96 |
| 6,312,102 B1 | 11/2001 | Moriyama et al. | 347/43 |
| 6,494,943 B1 | * 12/2002 | Yu et al. | 106/31.65 |
| 6,536,891 B2 | * 3/2003 | Oyanagi | 347/100 |

FOREIGN PATENT DOCUMENTS

| | | |
|---|---|---|
| EP | 1 086 997 A2 | 3/2001 |
| JP | 3-41171 | 2/1991 |
| JP | 11-57458 | 3/1999 |

* cited by examiner

Primary Examiner—Stephen D. Meier
Assistant Examiner—Manish Shah
(74) Attorney, Agent, or Firm—Fitzpatrick, Cella, Harper & Scinto

(57) ABSTRACT

An ink set for ink-jet recording that includes a plurality of inks containing coloring materials insoluble in water to form a high quality ink-jet recording image is provided. The water-based ink set for ink-jet recording includes a black ink and a color ink, wherein the black ink contains a carbon black as a coloring material having a volume average particle diameter determined by dynamic light scattering of not less than 50 nm, the color ink contains a pigment as a coloring material having a volume average particle diameter determined by dynamic light scattering of not more than 60 nm, and an accumulative 90% particle diameter of volume particle size distribution of not more than 100 nm, the volume average particle diameter of the carbon black of the black ink is larger than the volume average particle diameter of the pigment of the color ink, and the black ink has a surface tension higher than that of the color ink.

22 Claims, 6 Drawing Sheets

INK SET FOR INK-JET RECORDING, RECORDING METHOD, INK CARTRIDGE, RECORDING UNIT, AND INK-JET RECORDING APPARATUS

BACKGROUND OF THE INVENTION

1. Field of the Invention

The present invention relates to an ink set for ink-jet recording, a recording method, an ink cartridge, a recording unit and an ink-jet recording apparatus.

2. Related Background Art

Nowadays, the quality of ink-jet recording images has become almost equal to that of the silver salt photography. Meanwhile, in view of further improvement of fastness of the ink-jet recording images such as light fastness, it is being studied to use water-insoluble coloring materials such as pigments for all of inks used for multi-color image formation, for example, yellow (Y) ink, magenta (M) ink, cyan (C) ink and black (Bk) ink. The inventors of the present invention have found, however, that the quality of ink-jet images formed with such inks (all water-insoluble pigment inks) comes short of the silver halide photography level, and that further technical development is required-to obtain an ink-jet recording image of which quality is as high as that of silver salt photography by using such an ink set.

SUMMARY OF THE INVENTION

Accordingly, an object of the present invention is to provide an ink set of pigment inks suitable for forming high quality multi-color images with the ink-jet recording system where bleed between black image and adjoining color image is significantly alleviated.

Another object of the present invention is to provide an ink-jet recording method for forming a high-quality ink-jet recording image using the above-described ink set.

Still another object of the present invention is to provide a recording unit for forming a high-quality ink-jet recording image using the above-described ink set and an ink-jet recording apparatus.

According to a first aspect of the present invention, there is provided an ink set for ink-jet recording comprising an aqueous black ink and an aqueous color ink, wherein the black ink comprises a carbon black as a coloring material having a-volume average particle diameter determined by dynamic light scattering of not less than 50 nm, the color ink comprises a pigment as a coloring material having a volume average particle diameter determined by dynamic light scattering of not more than 60 nm, and an accumulative 90% particle diameter of volume particle size distribution of not more than 100 nm, the volume average particle diameter of the carbon black is larger than that the pigment in the color ink, and wherein the surface tension of the black ink is higher than that of the color ink.

According to another embodiment of the present invention, there is provided an ink set for ink-jet recording comprising at least inks of four colors of black, yellow, magenta and cyan, wherein (a) the black ink comprises at least water and carbon black, and a volume average particle diameter of coloring material by a dynamic light scattering method is no less than 50 nm, (b) yellow, magenta and cyan comprise at least water and organic pigment, a volume average particle diameter of coloring material by a dynamic light scattering method is not more than 60 nm, and accumulative 90% particle diameter of volume particle size distribution is not more than 100 nm, (c) the volume average particle diameter of the coloring material in the black ink is larger than the volume average particle diameter of the coloring material in the color ink, and a surface tension of the black ink is higher than that of the color ink.

According to another aspect of the present invention, there is provided an ink-jet recording method comprising the steps of, (i) preparing the above-described ink set for ink-jet recording;

(ii) applying the black ink to recording medium; and (iii) applying the color ink to recording medium.

According to still another aspect of the present invention, there is provided an ink cartridge comprising ink tanks accommodating inks of the above-described ink set respectively.

According to still another aspect of the present invention, there is provided a recording unit comprising ink tanks accommodating inks of the above-described ink set respectively, and ink-jet heads that discharge the black ink and the color inks respectively.

According to still another aspect of the present invention, there is provided an ink-jet recording apparatus comprising ink tanks accommodating the inks of the above-described ink set respectively, and ink-jet heads that discharge the black ink and the color inks respectively.

The present invention enables obtaining images with significantly improved water fastness, light fastness and gas fastness and with significantly alleviated bleed between abutting black and color regions of the image by using inks all containing pigments as the coloring material.

DETAILED DESCRIPTION OF PREFERRED EMBODIMENTS

Figure 1:
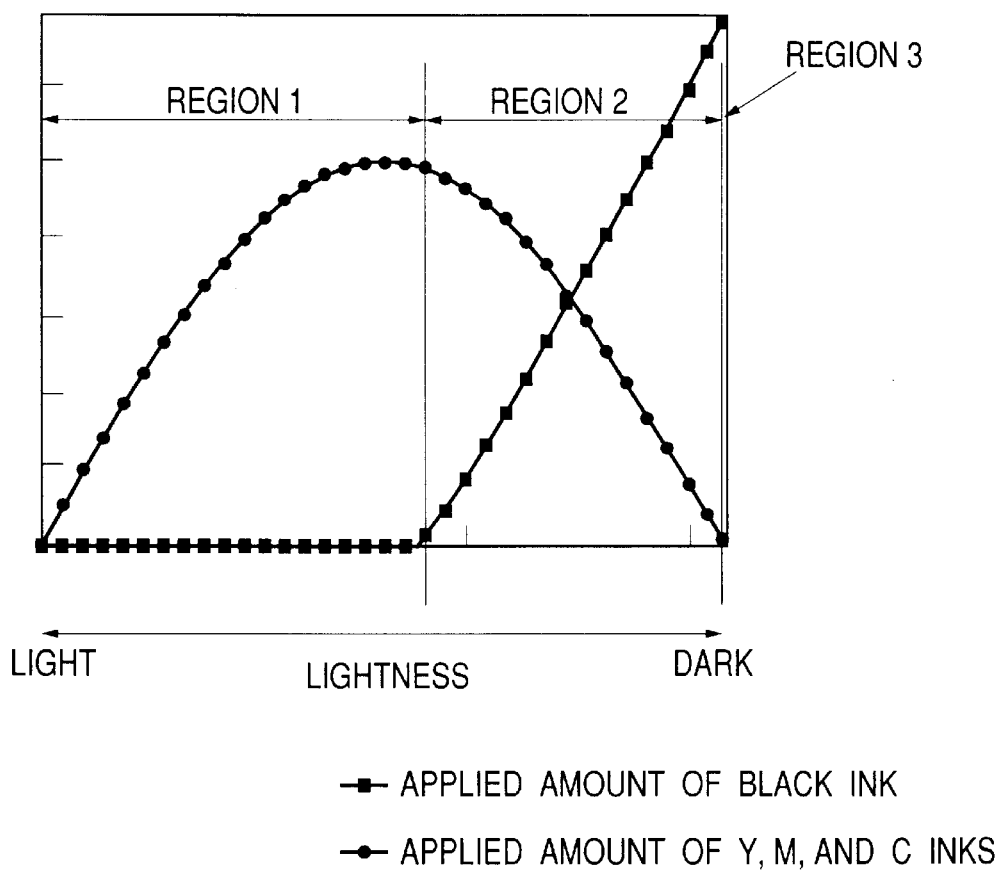
FIG. 1 shows regions of gray image.

The present inventors have found that techniques used for dye inks containing dyestuff as the coloring material are also effective to an ink set of inks containing pigment as the coloring material. That is, with an ink set of dye inks, it is preferable for a black dye ink to have comparatively high surface tension since higher optical density and edge sharpness are required for black ink that is mainly used for printing characters, and for color dye inks to have relatively low surface tension, to reduce color bleed, i.e., color mixing, between abutting color regions when the color inks are applied on the recording medium. This has been already known as disclosed in Japanese Patent Application Laid-Open No. 3-41171. Through studies of the ink-jet recording system using pigment inks, the present inventors have found that it is also effective that the black pigment ink has a high surface tension and color pigment inks have surface tension lower that that of the black pigment ink, to form multi-color images of high quality. In this case, however, one technical problem to be solved is the bleed phenomenon between abutting black image and color image on the recording medium. As a result of intensive study to solve this problem, the present inventors came to find that when the coloring materials of pigment inks of an ink set have certain average particle diameters, the ink set is suitable for formation of high-quality multi-color image with alleviated bleed between black and color images. The present invention was made based on this finding.

The ink set of the present invention is a set of water-based inks for ink-jet recording of black and at least one other color, wherein the black ink contains carbon black as the coloring material having a volume average particle diameter of not less than 50 nm determined by the dynamic light scattering; the color ink contains a pigment as the coloring material having a volume average particle diameter not higher than 60 nm, of which accumulative 90% particle diameter of the volume particle size distribution is not more than 100 nm; the volume average particle diameter of the coloring material of the black ink is larger than that of the coloring material of the color ink; and the surface tension of the black ink is higher than that of the color ink.

According to the present invention, pigment is used as the coloring material for every ink, thus the image formed with such inks has highly improved fastness to water, light and gas. Preferably, the coloring material of the black ink has a somewhat larger particle diameter to obtain high image density. On the other hand, the coloring material of the color ink has a somewhat smaller particle diameter for wide color reproduction range. With the black ink, the upper limit of the volume average particle diameter of the coloring material is desirably 200 nm in view of storage stability and clogging prevention in the nozzle, and the lower limit is desirably not less than 50 nm in view of the image density. With the color ink, it is desirable that the coloring material has a volume average particle diameter of 60 nm or less and a accumulative 90% particle diameter of volume particle size distribution of 100 nm or less, in view of the wide color reproduction range and outstanding light fastness of the formed image, and reduction of possibility of increase in ink viscosity.

In general, in order to prevent or alleviate bleed using a black ink and a color ink of the same polarity, e.g., both anionic, it is desirable to first print with the black ink, and then with the color ink after at least one or more of scan intervals. In such a case, however, when the particle diameter of the coloring material of the color ink is larger than that of the black ink, the bleed in the boundary region between a black image region and a color image region may not be sufficiently prevented. However, when the relationship between the particle diameter of carbon black in the black ink and that of the pigment of the color ink is adjusted as specified in the present invention, bleed is effectively improved when the black ink and the color ink are applied onto the recording medium in this order with one scan interval.

On the other hand, when a black ink and a color ink have different polarities, for example, a cationic black ink and an anionic color ink, the black ink and the color ink can be applied in the same scan. In this case also, it is desirable that the coloring material of the color ink has a particle size smaller than that of the black ink, and has a particle diameter by dynamic light scattering of not more than 60 nm, and a accumulative 90% particle diameter of particle volume distribution of 100 nm or less. That is, bleed between the black image and the color image can be effectively suppressed by adopting such constitution. Although the mechanism is not still clear, probably, smaller particle size of the coloring material of the color ink may increase reactive surface area with the coloring material in black ink, which may prevent bleed effectively.

When the particle diameter of the coloring material of the color ink is larger than that of the black ink, bleed between a black image region and a color image region may not always be sufficiently suppressed. Even when the former is smaller than the latter, if the former exceeds 60 nm, sometimes bleed is not suppressed sufficiently.

Next, in the case that a permeable color ink is first applied to the recording medium followed by black ink application to improve fixation, if the particle diameter of the coloring material of the color ink is too large, the color ink's permeability into the recording medium may be reduced, and it diminishes fixation-improving effect of such under-printing. On the contrary, if the particle diameter of the coloring material of the color ink is too small, for example, as the same level as a dyestuff, oozing may occur due to high penetrability of the color ink, and image quality may be deteriorated, although fixation of the black ink is improved by the under printing.

When an image is formed in achromatic color, it is preferable to form a region of high lightness (Region 1) with yellow ink, magenta ink and cyan ink, a region of lower lightness (Region 2) with black ink together with yellow, cyan and magenta inks, and finally only the black ink is used to form the darkest region (Region 3) as shown in FIG. 1.

This process enables formation of grainless image even in the lightest region. However, when printing is carried out while an ink-jet head is moving forward and backward, hereinafter, called "binary printing", using an ink set of black and color inks of different ionicity to form the above-described achromatic image, difference in the image density may occur in the region 2 due to the reverse application order of the black and color inks called "black image density unevenness due to binary printing". In this case also, the ink-jet ink set of the present invention, especially the ink set of black and color inks having different ionicity, may surprisingly improve this black density unevenness due to binary printing.

The present invention will be further described in detail referring to preferable embodiments.

<Black Ink and Color Ink>

The black ink and color ink constituting the ink set according to the present invention each should contain the coloring material in an amount of 2% to 12% by weight, and preferably of 1% to 20%. Carbon black for the black ink is carbon black manufactured by the furnace method or channel process, and has a primary particle diameter of 15 to 40 mμ, a BET specific surface area of 50 m$^2$/g to 300 m$^2$/g, a DBP oil absorption of 40 ml/100 g to 150 ml/100 g, a volatile matter of 0.5% to 10%, and a pH value of 2 to 9.

Commercially available such a carbon black pigment (C. I. pigment black 7) includes No. 2300, No. 900, MCF-88, No. 33, No. 40, No. 45, No. 52, MA7, MA8, MA100, and No. 2200B (manufactured by MITSUBISHI CHEMICAL CORPORATION); Raven700, 5750, 5250, 5000, 3500, 1255 (manufactured by Clumbia Chemical Company); Regal400R, 330R, 660R, MogulL, Monarch700, 800, 880, 900, 1000, 1100, 1300, 1400 (manufactured by Cabot Corporation); Color black FW1, FW2, FW2V, FW18, FW200, S150, S160, S170, Printex35, U, V, 140U, 140V, and Special black 6, 5, 4A, 4 (manufactured by Degussa AG), but the present invention is not limited thereto.

Pigments usable for the yellow ink include C.I. pigment yellow 1, 2, 3, 12, 13, 14, 16, 17, 73, 74, 75, 83, 93, 95, 97, 98, 114, 128, 129, 151 and 154, but the present invention is not limited thereto.

Pigments usable for the magenta ink include C.I. pigment red 5, 7, 12, 48 (Ca), 48 (Mn), 57 (Ca), 57:1, 112, 123, 168, 184 and 202, but the present invention is not limited thereto.

Pigment usable for the cyan ink include C.I. pigment blue 1, 2, 3, 15:3, 15:34, 16, 22, 60, C.I. vat blue 4 and 60, but the present invention is not limited thereto. Besides, pigments newly produced for the present invention may also be used.

In the present invention, the coloring material for the black ink has a volume average particle diameter determined by dynamic light scattering of not less than 50 nm, and the coloring material for the color ink has a volume average particle diameter of determined by dynamic light scattering of 60 nm or less, and a accumulative 90% particle diameter of volume particle size distribution is 100 nm or less. These values are those when the particles are dispersed in an aqueous medium, more specifically, when the ink is diluted with pure water to a sample concentration index of 0.01 to 0.1, and dispersed by an ultrasonic washer (UPA150, a product of Microtrack, Inc).

The above-described pigment can be dispersed stably in an aqueous ink by various well-known methods such as use of a dispersant (water soluble resin, or acid/alkali soluble resins), microcapsulation of pigment particles by interfacial polymerization, interface sedimentation etc., by introduction of an ionic functional group by general surface treatment such as plasma treatment and covalent bonding of a functional group onto the pigment surface by way of diazonium coupling etc., but not limited thereto.

The liquid medium to dissolve or disperse the above-described pigment is preferably a mixture of water and a water-soluble organic solvent. Specific examples of the water-soluble organic solvents are: alkyl alcohols with carbon numbers of one to four, such as methyl alcohol, ethyl alcohol, n-propyl alcohol, isopropyl alcohol, n-butyl alcohol, sec-butyl alcohol and tert-butyl alcohol; amides, such as dimethylformamide and dimethylacetamide; ketones, such as acetone; ethers, such as tetrahydrofuran and dioxane; polyalkyleneglycols, such as polyethylene glycol and polypropylene glycol; alkylene glycols of C2–C6 alkylene group such as ethylene glycol, propylene glycol, butylene glycol, triethylene glycol, 1,2,6-hexane triol, thiodiglycol, hexylene glycol, and diethylene glycol; lower alkyl ether of polyhydric alcohols such as glycerol, ethylene glycol monomethyl (or ethyl) ether, and diethylene glycol monomethyl (or ethyl) ether; cyclic amide compounds such as N-methyl-2-pyrrolidone, 1,3-dimethyl-2-imidazoridinone, sulfolane, dimethyl sulfoxide, 2-pyrolidone, and epsilon caprolactam; and imido compounds such as succinimide.

In general, the above-described water-soluble organic solvent may be contained in a range of 1% to 40% to total weight of the ink, and more preferably of 3% to 30%. The water content of the ink is preferably in the range of 30 to 95 weight %, in view of good pigment dispersion, low viscosity, and satisfying fixation properties. The concentration by weight of the pigment may be suitably selected according to the pigment type, for color ink, preferably in the range of 0.1% to 20%, more preferably, 0.1% to 12% to the total weight of the ink. If necessary, additives may be added in addition to the above described components, such as surfactants, pH adjusters, rust-proofing agents, fungicides, evaporation accelerators, chelating agents, and water-soluble polymers.

Preferable viscosity of the black ink in the present invention is 1 cp to 10 cps, more preferably, 1.5 cps to 5 cps. Such a black ink can be ejected from an ink-jet nozzle at a high frequency. Preferable surface tension of the black ink is 35 dyne/cm or higher, and more preferably not less than 38 dyne/cm, when character print quality is taken into account.

Preferable viscosity of the color ink in the present invention is 1 cp to 10 cps, more preferably 1.5 cps to 5 cps. Such a color ink can be ejected from an ink-jet nozzle at high frequency. Considering that bleed phenomenon at the boundary of a colored region and a black region abutting each other will deteriorate the print quality of the multicolor image, the surface tension of the color ink is desirably not more than 35 dynes/cm. Although, as mentioned above, high surface tension of black ink is advantageous in view of character quality, it is effective to make surface tension not more than 35 dyne/cm in view of improvement of image uniformity of primary color and secondary color. Therefore, in the present invention, the surface tension of the black ink is higher than that of the color ink.

Any conventional ink-jet recording method may be used in the present invention as long as the ink set of the present invention is used. One preferable ink-jet recording method is one that ejects ink droplet by applying thermal energy in accordance with recording signals to the ink in the chamber of a recording head.

The ink set of ink-jet inks according to the present invention contains at least one color ink selected from color inks required for multicolor image formation, i.e., yellow (Y) ink, cyan (C) ink and magenta (M) ink. More preferably, the ink set comprises all of these inks required for formation of multi-color image and the inks satisfy the conditions required for the color ink according to the present invention. Another embodiment is an ink set of which color ink comprises, a Y ink, a first C ink, a second C ink, a first M ink, and a second M ink. Here the first and the second C inks are different in the coloring material concentration, the same with the first and the second M inks.

An example of a suitable ink-jet recording apparatus of the present invention to record using the above described ink set of the present invention will hereinafter be described.

Figure 2:
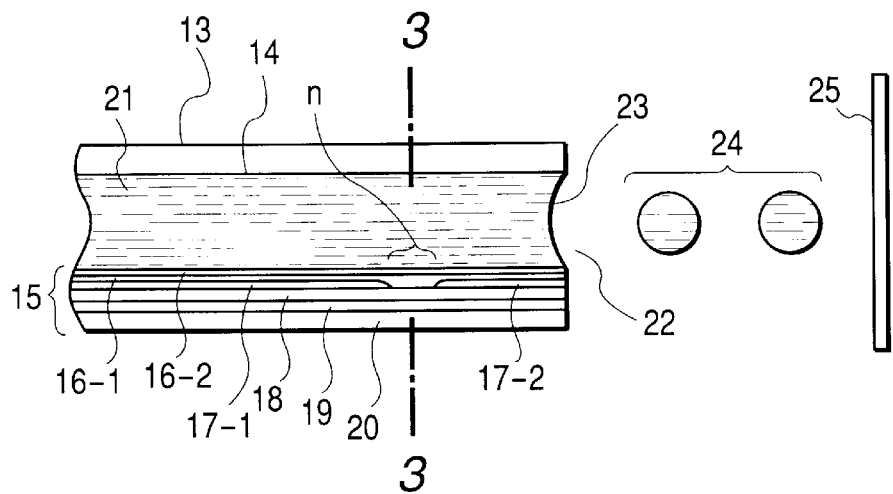
FIG. 2 is a longitudinal sectional view showing an example of a head of an ink-jet recording apparatus.
Figure 3:
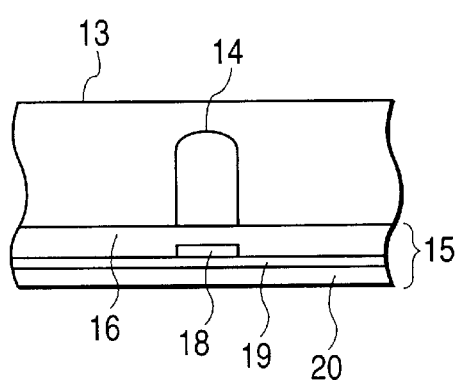
FIG. 3 is a sectional view of an ink-jet recording head of FIG. 2 taken along line 3—3.

FIGS. 2 and 3 are schematic sectional views illustrating an example of the construction of a head, which is a main component of such an image recording apparatus. Specifically, FIG. 2 is a schematic cross-sectional view of a head 13 taken along the flow path of ink, and FIG. 2 is a cross-sectional view taken along line 3—3 in FIG. 2. The head 13 is formed by bonding a glass, ceramic, silicon or plastic plate or the like having a flow path (nozzle) 14 through which an ink is passed, to a heating substrate 15. The heating substrate 15 is composed of a protective film 16 made of silicon oxide, silicon nitride, silicon carbide or the like, electrodes 17-1 and 17-2 formed of aluminum, gold, aluminum-copper alloy or the like, a heating resistor layer 18 formed of a high-melting material such as, $HfB_2$, TaN or TaAl, a heat accumulating layer 19 formed of silicon oxide, aluminum oxide or the like, and a substrate 20 made of silicon, aluminum, aluminum nitride or the like having a good heat radiating property.

Now, upon application of pulsed electric signals to the electrodes 17-1 and 17-2 of the head 13, the heating substrate 15 rapidly generates heat at the region shown by "n" to form bubbles in an ink 21 which is in contact with this region. A meniscus 23 of the ink is projected by the pressure thus produced, and the ink 21 is ejected from an ejection orifice 22 through the nozzle 14 of the head 13 toward a recording medium 25. FIG. 3 illustrates an appearance of a multi-head composed of an array of a number of heads as shown in FIG. 2. The multi-head is formed by closely bonding a glass plate 27 having a number of grooves 26 to a heating head 28 similar to that described in FIG. 2.

Figure 5:
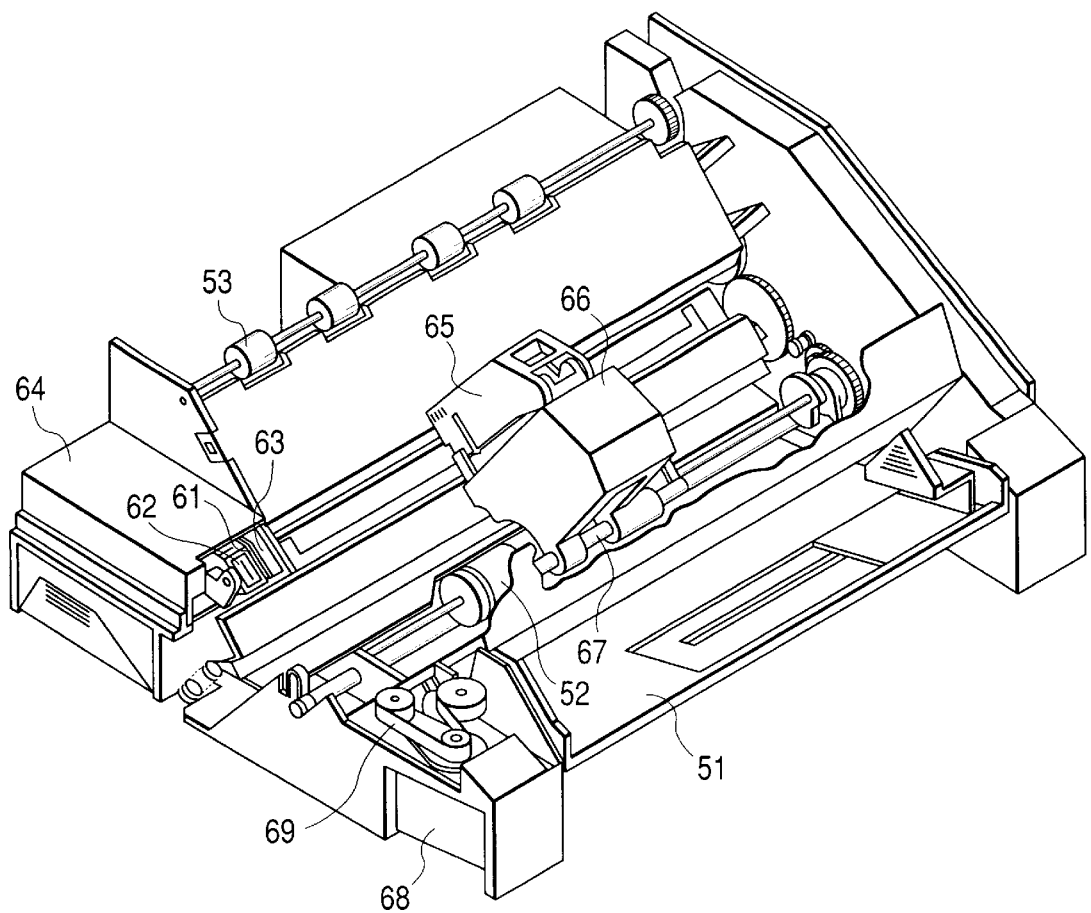
FIG. 5 is a schematic perspective view showing an example of an ink-jet recording apparatus.

FIG. 5 illustrates an example of an ink-jet recording apparatus in which such a head as described above has been incorporated. In FIG. 5, reference numeral 61 designates a blade serving as a wiping member, one end of which is a stationary end held by a blade-holding member to form a cantilever. The blade 61 is provided at a position adjacent to a region in which a recording head 65 operates, and in this embodiment, is held in such a form that it protrudes into the course through which the recording head 65 is moved.

Reference numeral 62 indicates a cap for the face of ejection openings of the recording head 65, which is provided at a home position adjacent to the blade 61, and is so constructed that it moves in a direction perpendicular to a direction in which the recording head 65 is moved, and comes into contact with the face of the ejection openings to cap it. Reference numeral 63 denotes an ink absorbing member provided adjoiningly to the blade 61 and, similar to the blade 61, held in such a form that it protrudes into the course through which the recording head 65 is moved. The above-described blade 61, cap 62 and ink absorbing member 63 constitute an ejection-recovery portion 64, where the blade 61 and ink absorbing member 63 remove water, dust and/or the like from the face of the ink-ejecting openings.

Reference numeral 65 designates the recording head having an ejection-energy-generating means and serving to eject the ink onto a recording medium set in an opposing relation to the ejection opening face provided with the ejection openings to conduct recording. Reference numeral 66 indicates a carriage on which the recording head 65 is mounted so that the recording head 65 can be moved. The carriage 66 is slidably interlocked with a guide rod 67 and is connected (not illustrated) at its part to a belt 69 driven by a motor 68. Thus, the carriage 66 can be moved along the guide rod 67 and hence, the recording head 65 can be moved from a recording region to a region adjacent thereto.

Reference numerals 51 and 52 denote a feeding part from which the recording medium is inserted, and feed rollers driven by a motor (not illustrated), respectively. With such a construction, the recording medium is fed to the position opposite to the ejection opening face of the recording head 65, and discharged from a discharge section provided with discharge rollers 53 with the progress of recording. In the above construction, the cap 62 in the head recovery portion 64 is receded from the path of motion of the recording head 65 when the recording head 65 is returned to its home position, for example, after completion of recording, and the blade 61 remains protruded into the path of motion. As a result, the ejection opening face of the recording head 65 is wiped.

When the cap 62 comes into contact with the ejection opening face of the recording head 65 to cap it, the cap 62 is moved so as to protrude into the path of motion of the recording head 65.

When the recording head 65 is moved from its home position to the position at which recording is started, the cap 62 and the blade 61 are at the same positions as the positions for the wiping as described above. As a result, the ejection opening face of the recording head 65 is also wiped at the time of this movement. The above movement of the recording head 65 to its home position is made not only when the recording is completed or the recording head 65 is recovered for ejection, but also when the recording head 65 is moved between recording regions for the purpose of recording, during which it is moved to the home position adjacent to each recording region at given intervals, where the ejection opening face is wiped in accordance with this movement.

Figure 6:
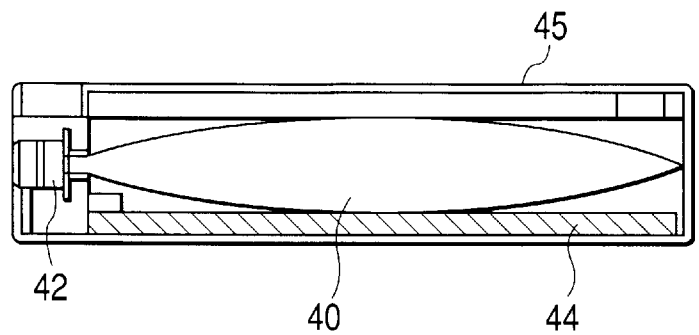
FIG. 6 is a longitudinal sectional view showing an example of an ink cartridge.

FIG. 6 illustrates an exemplary ink cartridge 45 in which an ink to be fed to a head through an ink-feeding member, for example, a tube is contained. Here, reference numeral 40 designates an ink container portion containing the ink to be fed, as exemplified by a bag for the ink. One end thereof is provided with a stopper 42 made of rubber. A needle (not illustrated) may be inserted into this stopper 42 so that the ink in the bag 40 for the ink can be fed to the head. Reference numeral 44 indicates an absorbing member for receiving a waste ink.

It is preferred that the ink container portion 40 be formed of a polyolefin, in particular, polyethylene, at its surface with which the ink comes into contact.

The ink-jet recording apparatus used in the present invention are not limited to the apparatus as described above in which the head and the ink cartridge are separately provided. Therefore, a device in which these members are integrally formed as shown in FIG. 7 can also be preferably used.

Figure 7:
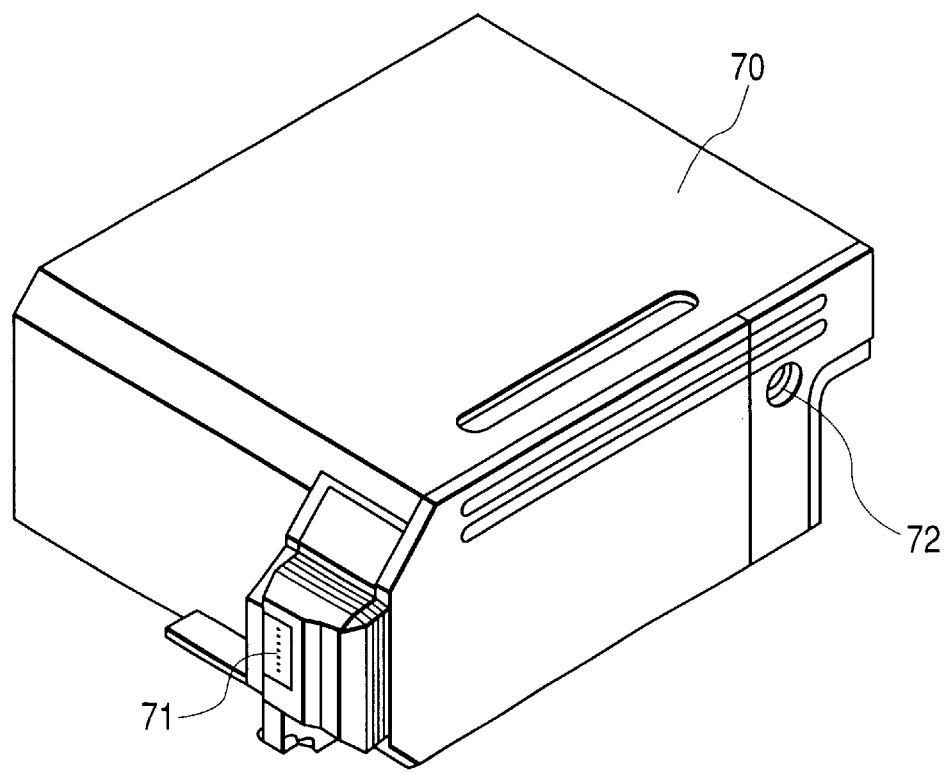
FIG. 7 is a perspective view showing an example of a recording unit.

In FIG. 7, reference numeral 70 designates a recording unit, in the interior of which an ink container portion containing an ink, for example, an ink absorbing member, is contained. The recording unit 70 is so constructed that the ink in such an ink absorbing member is ejected in the form of ink droplets through a head 71 having a plurality of orifices. In the present invention, polyurethane is preferably used as a material for the ink absorbing member.

The ink container portion may be constructed without using the ink absorbing member by a bag for the ink in the interior of which a spring or the like is provided.

Reference numeral 72 indicates an air passage for communicating the interior of the recording unit 70 with the atmosphere. This recording unit 70 is used in place of the recording head 65 shown in FIG. 5, and is detachably installed on the carriage 66.

As a preferable example of an ink-jet recording apparatus making good use of mechanical energy, may be mentioned an On-Demand type ink-jet recording apparatus comprising a nozzle-forming substrate having a plurality of nozzles, pressure-generating devices composed of a piezoelectric material and an electric conductive material provided in an opposing relation to the nozzles, and an ink filled around the pressure-generating devices, wherein the pressure-generating devices are changed by voltage applied to eject droplets of the ink from the nozzles. An example of the construction of a recording head, which is a main component of such a recording apparatus, is illustrated in FIG. 8.

The head is composed of an ink flow path 80 communicating with an ink chamber (not illustrated), an orifice plate 81 through which ink droplets having a desired volume are ejected, a vibration plate 82 for directly applying a pressure to the ink, a piezoelectric element 83 bonded to the vibration plate 82 undergoing a change according to an electric signal, and a substrate 84 adapted to support and fix the orifice plate 81, the vibration plate 82 and the like thereon.

Figure 8:
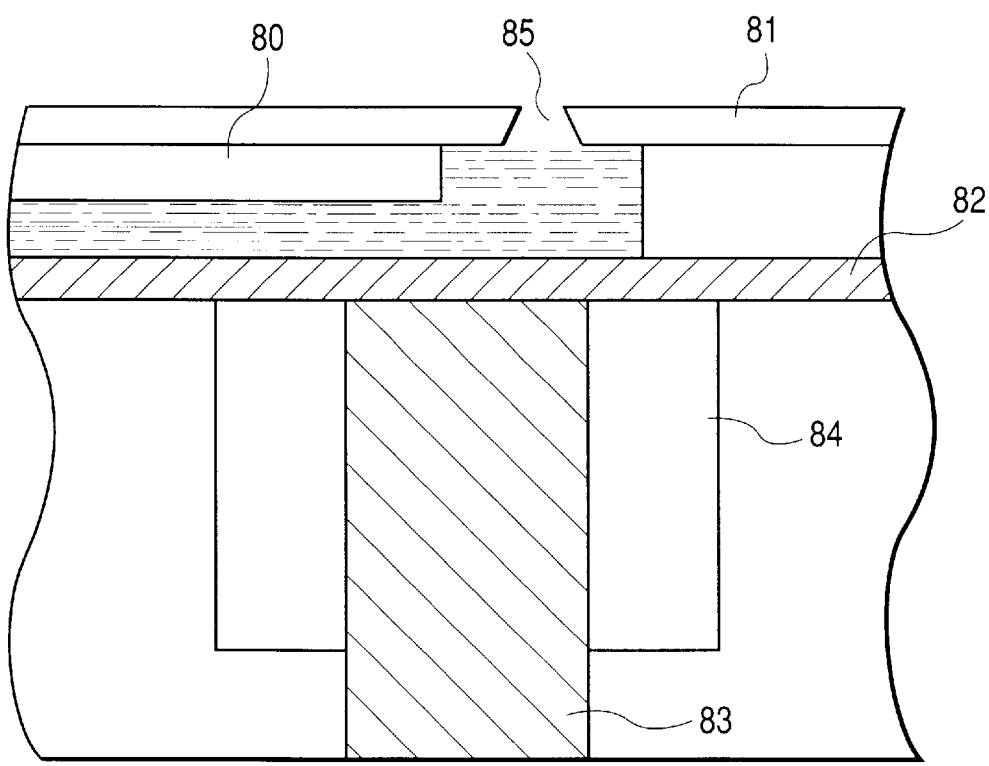
FIG. 8 is a schematic sectional view showing an example of constitution of an ink-jet recording head using mechanical energy.

In FIG. 8, the ink flow path 80 is formed with a photosensitive resin or the like. The orifice plate 81 is made of a metal such as stainless steel or nickel, and an ejection opening 85 of which is formed by electroforming, punching by press working, or the like. The vibration plate 82 is formed with a film of a metal such as stainless steel, nickel or titanium and a high-modulus resin film or the like. The piezoelectric element 83 is made of a dielectric material such as barium titanate or PZT.

The recording head with the above construction is operated in such a manner that pulsed voltage is applied to the piezoelectric element 83 to generate a stress to cause strain, the vibration plate 82 bonded to the piezoelectric element 83 is deformed by the energy of the stress, and the ink in the ink flow path 80 is thus perpendicularly pressurized to eject ink droplets (not illustrated) from the ejection opening 85 of the orifice plate 81, thereby conducting recording.

Such a recording head is used included in the same ink-jet recording apparatus as is shown in FIG. 5. Operation in details of the ink-jet recording apparatus may be similar to the operation mentioned above.

Figure 4:
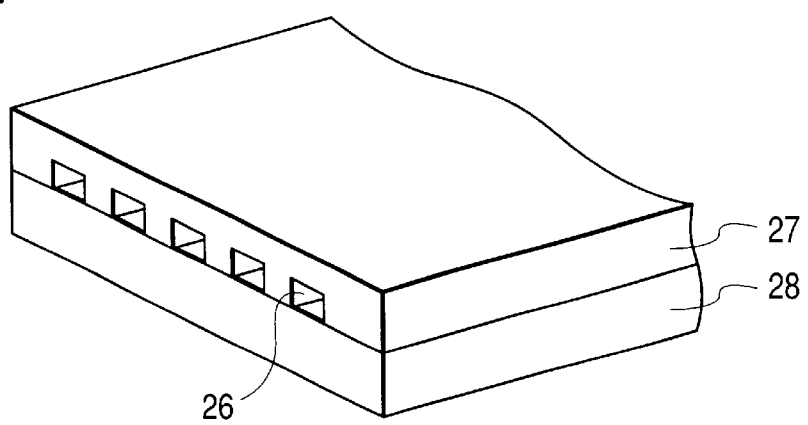
FIG. 4 is an external perspective view of a head made up of heads as shown in FIG. 1.
Figure 9:
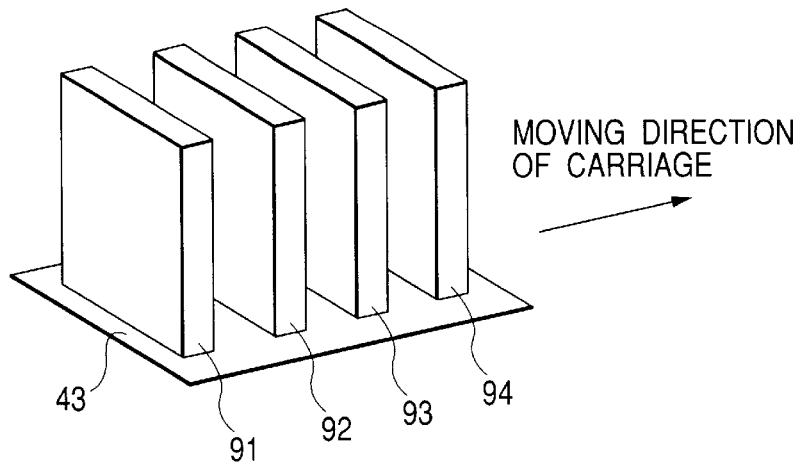
FIG. 9 is a perspective view showing a recording part in which a plurality-of recording heads are arranged.
Figure 10:
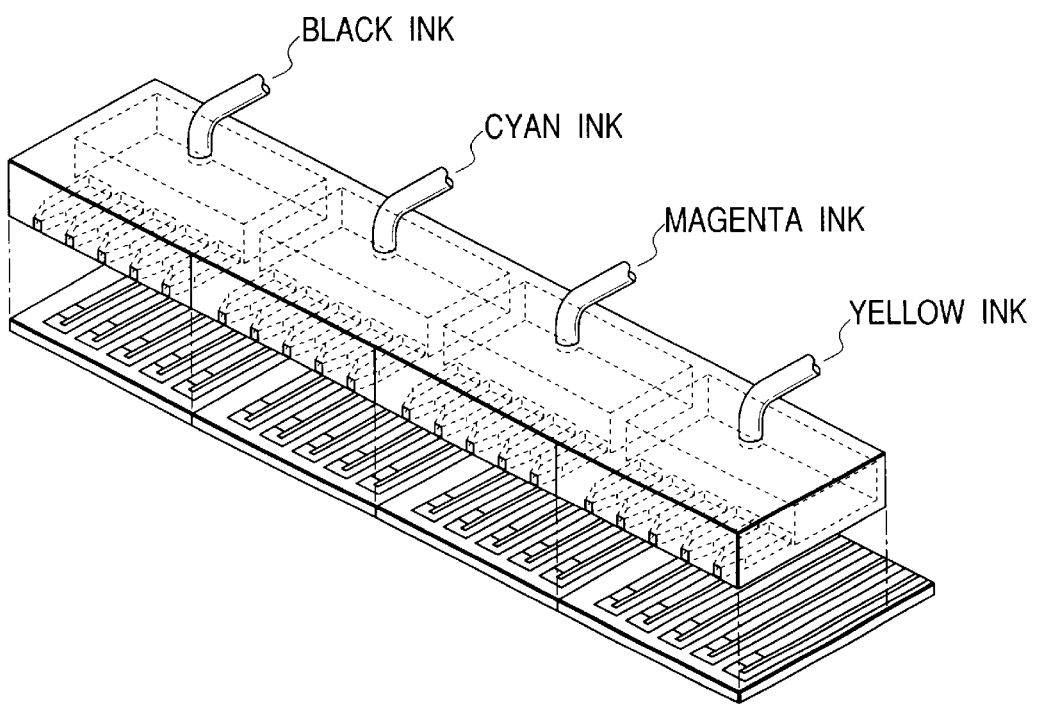
FIG. 10 is a perspective view of a recording head of another embodiment of the present invention.

When forming color image by an image formation method of the present invention, a recording device in which 4 recording heads shown in FIG. 4 are arranged on a carriage 43 is used. FIG. 9 shows an example. Reference numerals 91, 92, 93, and 94 are recording heads for discharging each of four kinds of inks, for example, magenta (M) ink, cyan (C) ink, yellow (Y) ink, and black ink, respectively. These heads are arranged in the above described recording device, and discharge the inks of each color according to a record signal.

In FIG. 9 an example of four heads used is shown, but the present invention is not limited thereto. It is also preferable those in which one recording head has four flow paths for M ink, C ink, Y ink, and Bk ink.

EXAMPLES

The present invention is described further in detail by Examples and Comparative Examples. Hereinafter, "part" and "%" are by weight if not otherwise noted.

<Preparation of Black Ink 1>

Styrene-acrylic acid copolymer (Joncryl 678; tradename, manufactured by Johnson Polymer Co.), potassium hydroxide of an amount required to neutralize the copolymer and water were mixed and stirred at about 60° C. to prepare an aqueous solution of 10% styrene-acrylate copolymer.

This styrene acrylate copolymer was used as a dispersant to prepare the following black pigment dispersion.

| | |
|---|---|
| 10% styrene acrylate copolymer aqueous solution | 30 parts |
| Carbon black | 7 parts |
| Glycerol | 20 parts |
| Diethylene glycol | 20 parts |
| Triethylene glycol | 10 parts |
| Pure water | 14 parts |

These ingredients were put in a batch type vertical sand mill to which glass beads of 500 μm in diameter were filled as a disruption medium and dispersed at a medium speed of 5000 rpm for 4 hours under water cooling. This black pigment dispersion was centrifuged at 10000 rpm for 30 minutes, and the supernatant was diluted with water twofold to obtain a solution. Furthermore, Acetylenol EH (manufactured by Kawaken Fine Chemicals Co., Ltd.) was added to this solution to 0.2 wt % of the solution, and then the solution was subjected to centrifugation at 10000 rpm for 30 minutes to remove coarse particles. Finally, the solution was filtrated through a membrane filter of 1 μm pore size to obtain Black Ink 1. The volume average particle diameter determined by dynamic light scattering using a particle diameter measuring apparatus (trade name: UPA15; manufactured by Microtrack Inc.) was 45 nm.

<Preparation of Black Ink 2>

A solution was prepared by dissolving 5 g of conc. HCl into 5.3 g of water, and into which 1.85 g of anthranilic acid was added at 5° C. By maintaining the solution of anthranilic acid at 10° C. or lower, a solution of 8.7 g of sodium nitrite in 8.5 g of water (5° C.) was added and stirred for 15 minutes. To this solution, 20 g of carbon black with a surface area of 320 m²/g by BET and a DBP oil absorption of 120 ml/100 g was added and stirred for 15 minutes. The slurry obtained in this manner was filtered with TOYO filter paper No. 2 (from Advantist Co., Ltd.), and the pigment particles were fully washed with water, and then dried in an oven at 110° C. Then water was added the pigment to prepare 10 wt % pigment aqueous solution. Thus, a group represented by the following chemical formula (I) was introduced to the surface of carbon black.

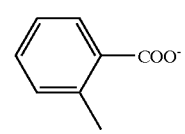

(I)

Subsequently, 100 g of the above aqueous pigment solution was added to 10 g of strongly acidic ion-exchange resin (product name; Diaion SK1B, manufactured by NIPPON RENSUI CO.) and agitated for 2 hours to change the above-described carboxyl group to H type by ion exchange. Then after removing the ion-exchange resin from the pigment solution by filtrating through a mesh filter of 100 μm in pore size, ammonia was added to the filtrate and pH was adjusted to pH 8 to give Pigment Dispersion 2.

| | |
|---|---|
| Pigment Dispersion 2 | 60 parts |
| Glycerol | 5 parts |
| Diethylene glycol | 5 parts |
| Acetylenol EH (Kawaken Fine Chemicals Co., Ltd.) | 0.15 parts |
| Ion exchange water | to 100 parts |

The above ingredients were blended, and filtrated through a membrane filter of 1.0 μm in pore size, to give Black Ink 2. The volume average particle diameter of this ink was determined by dynamic light scattering using a particle diameter measuring apparatus (trade name: UPA15; Microtrack, Inc.). It was 80 nm.

<Preparation of Black Ink 3>

| | |
|---|---|
| Carbon black (MCF-88; Mitsubishi Chemical Corporation) | 30 parts |
| Styrene-methacrylic acid (acid value 120, neutralized with 1.0 equivalent of KOH) | 8 parts |
| Ion exchange water | 267 parts |

These ingredients were dispersed by a sand mill for 4 hours using zirconia beads as a pulverization medium. After centrifugation (12000 rpm, 30 min), the supernatant was filtrated with a membrane filter of 1.0 μm in pore size. Thus, pigment dispersion 3 was prepared.

| | |
|---|---|
| Pigment dispersion 3 | 60 parts |
| Glycerol | 5 parts |
| Diethylene glycol | 5 parts |
| Acetylenol EH (Kawaken Fine Chemicals Co., Ltd.) | 0.15 parts |
| Ion exchange water | to 100 parts |

The above ingredients were blended, and filtrated through a membrane filter of 1.0 μm in pore size, to give Black Ink 3. The volume average particle diameter of this ink was determined by dynamic light scattering using a particle diameter measuring apparatus (trade name: UPA15; Microtrack, Inc.). It was 120 nm.

<Preparation of Black Ink 4>

| | |
|---|---|
| Carbon black (MCF-88; Mitsubishi Chemical Corporation) | 30 parts |
| Styrene-acrylic acid (acid value 100, neutralized with 1.0 equivalent KOH) | 8 parts |
| Ion exchange water | 267 parts |

These ingredients were dispersed by a sand mill for 1 hours using zirconia beads as a pulverization medium. After centrifugation (5000 rpm, 30 min), the supernatant was filtrated with a membrane filter of 2.5 μm in pore size. Thus, pigment dispersion 4 was prepared.

| | |
|---|---|
| Pigment dispersion 4 | 60 parts |
| Glycerol | 5 parts |
| Diethylene glycol | 5 parts |
| Acetylenol EH (Kawaken Fine Chemicals Co., Ltd.) | 0.15 parts |
| Ion exchange water | to 100 parts |

The above ingredients were blended, and filtrated through a membrane filter of 1.0 μm in pore size, to give Black Ink 4. The volume average particle diameter of this ink was determined by dynamic light scattering using a particle diameter measuring apparatus (trade name: UPA15; Microtrack, Inc.). It was 250 nm.

<Preparation of Black Ink 5>

Ten grams of carbon black having a surface area of 230 m²/g and DBP oil absorption of 70 ml/100 g and 3.41 g of 3-amino-N-ethylpyridinium bromide are mixed with 72 g of water, to which 1.62 g of nitric acid was added drop by drop with stirring at 70° C. Several minutes later, a solution of 1.07 g of sodium nitrite dissolved in 5 g of water was added, and stirred for 1 hour. The obtained slurry was filtered through a filter paper, TOYO Filter Paper No. 2 (trade name, a product of Advantist Co.), and the pigment particles filtered out were fully washed with water and dried in a 110° C. oven. Then water was added to this pigment to prepare a 10% aqueous dispersion of the pigment. By the above method, a group of the chemical formula (II):

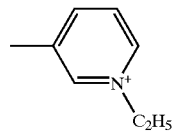

(II)

was introduced to the surface of the carbon black.

After that, 100 g of thus obtained pigment solution was mixed with 10 g of strongly basic ion-exchange resin (product name; Diaion SA-10A, manufactured by made NIPPON RENSUI CO.) and stirred for 2 hours to conduct ion exchanging of the pyridinium group to OH type. Then, the ion-exchange resin was removed from the pigment solution by filtration with a mesh filter of 100 μm in pore size, and pH of the pigment solution was adjusted to pH 5 adding acetic acid and nitric acid at a mole ratio of 7:3 to give Pigment Dispersion 5.

| | |
|---|---|
| Pigment dispersion 5 | 60 parts |
| Glycerol | 5 parts |
| Diethylene glycol | 5 parts |
| Acetylenol EH (Kawaken Fine Chemicals Co., Ltd.) | 0.15 parts |
| Ion exchange water | to 100 parts |

The above ingredients were blended, and filtrated through a membrane filter of 1.0 μm in pore size, to give Black Ink 4. The volume average particle diameter of this ink was determined by dynamic light scattering using a particle diameter measuring apparatus (trade name: UPA15; Microtrack, Inc.). It was 90 nm.

<Preparation of Black Ink 6>

| | |
|---|---|
| Carbon black | 10 parts |
| Styrene-N,N-dimethylamino ethylmethacrylate-ethylacrylate copolymer (molecular weight about 20,000, monomer composition ratio 50:30:20) | 10 parts |
| Methyl ethyl ketone | 30 parts |

These components were blended and dissolved, and then neutralized with 1.2 equivalent of acetic acid to carry out phase inversion emulsification, and then methyl ethyl ketone was removed to give Pigment dispersion 6 of which solid content concentration was 20% and mean particle diameter was 120 nm.

| | |
|---|---|
| Pigment dispersion 6 | 25 parts |
| Glycerol | 10 parts |
| Trimethylol propane | 7 parts |
| Acetylenol EH | 0.1 parts |
| Ion exchange water | to 100 parts |

These components were mixed with stirring and pH was adjusted to pH 4 with acetic acid. The resulting mixture was filtrated through a membrane filter of 1 μm in pore diameter to obtain Black Ink 6. The volume average particle diameter of this ink was determined by dynamic light scattering using a particle diameter measuring apparatus (trade name: UPA15; Microtrack, Inc.). It was 125 nm.

<Preparation of Color Ink Set 1>
Dyes
Yellow dye: Acid Yellow 23,
Magenta dye: Acid Red 52,
Cyano dye: Acid blue 9

| | |
|---|---|
| One of the above dyes | 3 parts |
| Glycerol | 5 parts |
| Diethylene glycol | 5 parts |
| Acetylenol EH | 1 part |
| Ion exchange water | to 100 parts |

These materials were mixed and filtered through a membrane filter of 0.2 μm pore size. Thus prepared dye color inks of yellow, magenta, and cyan were used for Color ink set 1.

<Preparation of Color Ink Set 2>

Surface treated yellow, magenta and cyan pigments were prepared by the gas phase method disclosed in Example 3 of Japanese Patent Application Laid-Open No. 11-057458, using Pigment Yellow 138, Pigment Red 122, and Pigment Blue 15:3 and oxygen as the process gas. Thus-obtained pigments were fine particles having carboxyl groups introduced onto the surface thereof. Then each of the pigments was mixed with other ingredients as follows:

| | |
|---|---|
| Pigment | 3 parts, |
| Glycerol | 5 parts, |
| Diethylene glycol | 5 parts, |
| Acetylenol EH | 1 part, and |
| Ion exchange water | remainder |

After pH was adjusted to 7 to 8 with aqueous ammonia, the mixture was filtrated through a membrane filter of 1 μm pore size. Thus obtained yellow, magenta, and cyan inks were used as Ink set 2. The volume average particle diameter of each ink was determined by dynamic light scattering using a particle diameter measuring apparatus (trade name: UPA15; Microtrack, Inc.). The volume average particle diameter was 40 nm for yellow ink, 45 nm for magenta ink, and 55 nm for cyan ink, and the accumulative 90% particle diameter was 75 nm, 90 nm and 95 nm respectively.

<Preparation of Color Ink Set 3>

Styrene-acrylic acid copolymer (Joncryl 678; trade name, manufactured by Johnson Polymer Co.), potassium hydroxide of an amount required to neutralize the copolymer and water were mixed and stirred at about 60° C. to prepare an aqueous solution of 10% styrene-acrylate copolymer.

This styrene acrylate copolymer was used as a dispersant to prepare C3 ink, M3 ink, and Y3 ink as follows.

C3 Ink

| | |
|---|---|
| 10% styrene acrylic acid copolymer aqueous solution | 30 parts |
| Pigment blue 15:3 | 6 parts |
| Glycerol | 20 parts |
| Diethylene glycol | 20 parts |
| Triethylene glycol | 10 parts |
| Pure water | 14 parts |

These ingredients were put in a batch type vertical sand mill to which glass beads of 500 μm in diameter were filled as a disruption medium and dispersed at a medium speed of 5000 rpm for 4 hours under water cooling. This cyan pigment dispersion was centrifuged at 10000 rpm for 30 minutes, and the supernatant was diluted with water twofold. Then, Acetylenol EH (Kawaken Fine Chemicals Co., Ltd.) was added to the solution to 1.0 wt %. Finally, it was filtrated through a membrane filter of 1 μm pore size to obtain C3 ink.

M3 Ink

| | |
|---|---|
| 10% styrene acrylic acid copolymer aqueous solution | 30 parts |
| Pigment Red 122 | 8 parts |
| Glycerol | 20 parts |
| Diethylene glycol | 20 parts |
| Triethylene glycol | 10 parts |
| Pure water | 14 parts |

These ingredients were put in a batch type vertical sand mill to which glass beads of 200 μm in diameter were filled as a disruption medium and dispersed at a medium speed of 9000 rpm for 6 hours under water cooling. This magenta pigment dispersion was centrifuged at 10000 rpm for 30 minutes, and the supernatant was diluted with water twofold, to which Acetylenol EH (Kawaken Fine Chemicals Co., Ltd.) was added to 1.0 wt %. Then the solution was subjected to centrifugation at 10000 rpm for 30 minutes to remove coarse particles. Finally, the ink was filtrated through a membrane filter of 1 μm pore size to obtain M3 ink.

Y3 Ink

| | |
|---|---|
| 10% styrene acrylic acid copolymer aqueous solution | 30 parts |
| Pigment Yellow 128 | 8 parts |
| Glycerol | 20 parts |
| Diethylene glycol | 20 parts |
| Triethylene glycol | 10 parts |
| Pure water | 14 parts |

These ingredients were put in a batch type vertical sand mill to which glass beads of 500 μm in diameter were filled as a disruption medium and dispersed at a medium speed of 5000 rpm for 5 hours under water cooling. This yellow pigment dispersion was centrifuged at 10000 rpm for 30 minutes, and the supernatant was diluted with water twofold to obtain a pigment solution. Acetylenol EH (Kawaken Fine Chemicals Co., Ltd.) was added to the solution to 1.0 wt % of the solution weight, and then the solution was subjected to centrifugation at 10000 rpm for 30 minutes to remove coarse particles. Finally, the solution was filtrated through a membrane filter of 1 μm pore size to obtain Y3 ink.

The volume average particle diameter of each ink was determined by dynamic light scattering using a particle diameter measuring apparatus (trade name: UPA15; Microtrack, Inc.). The volume average particle diameter was 124 nm for Y3 ink, 183 nm for M3 ink, and 128 nm for C3 ink, and the accumulative 90% particle diameter was 230 nm, 330 nm and 200 nm respectively.

<Preparation of Color Ink Set 4>

C4 ink, M4 ink, and Y4 ink constituting Color ink set 4 were prepared as follows using the aqueous solution of 10% of styrene-acrylic resin prepared as above for Color ink set 3.

C4 Ink

| | |
|---|---|
| 10% styrene acrylic acid copolymer aqueous solution | 30 parts |
| Pigment blue 15:3 | 6 parts |
| Glycerol | 20 parts |

-continued

| | |
|---|---|
| Diethylene glycol | 20 parts |
| Triethylene glycol | 10 parts |
| Pure water | 14 parts |

These ingredients were put in a batch type vertical sand mill to which glass beads of 500 $\mu$m in diameter were filled as a disruption medium and dispersed at a medium speed of 5000 rpm for 4 hours under water cooling. This cyan pigment dispersion was centrifuged at 10000 rpm for 30 minutes, and the supernatant was diluted with water twofold. Then, Acetylenol EH (Kawaken Fine Chemicals Co., Ltd.) was added to the solution to 1.0 wt %, and the solution was subjected to centrifugation at 10000 rpm for 30 minutes to remove coarse particles. Finally, it was filtrated through a membrane filter of 1 $\mu$m pore size to obtain C4 ink.

M4 Ink

| | |
|---|---|
| 10% styrene acrylic acid copolymer aqueous solution | 30 parts |
| Pigment Red 122 | 8 parts |
| Glycerol | 20 parts |
| Diethylene glycol | 20 parts |
| Triethylene glycol | 10 parts |
| Pure water | 14 parts |

These ingredients were put in a batch type vertical sand mill to which glass beads of 300 $\mu$m in diameter were filled as a disruption medium and dispersed at a medium speed of 7000 rpm for 5 hours under water cooling. This magenta pigment dispersion was centrifuged at 10000 rpm for 30 minutes, and the supernatant was diluted with water twofold, to which Acetylenol EH (Kawaken Fine Chemicals Co., Ltd.) was added to 1.0 wt %. Then the solution was subjected to centrifugation at 10000 rpm for 30 minutes to remove coarse particles. Finally, the ink was filtrated through a membrane filter of 1 $\mu$m pore size to obtain M4 ink.

Y4 Ink

| | |
|---|---|
| 10% styrene acrylic acid copolymer aqueous solution | 30 parts |
| Pigment Yellow 128 | 8 parts |
| Glycerol | 20 parts |
| Diethylene glycol | 20 parts |
| Triethylene glycol | 10 parts |
| Pure water | 14 parts |

These ingredients were put in a batch type vertical sand mill to which glass beads of 300 $\mu$m in diameter were filled as a disruption medium and dispersed at a medium speed of 9000 rpm for 5 hours under water cooling. This yellow pigment dispersion was centrifuged at 10000 rpm for 30 minutes, and the supernatant was diluted with water twofold to obtain a pigment solution. Acetylenol EH (Kawaken Fine Chemicals Co., Ltd.) was added to the solution to 1.0 wt % of the solution weight, and then the solution was subjected to centrifugation at 10000 rpm for 30 minutes to remove coarse particles. Finally, the solution was filtrated through a membrane filter of 1 $\mu$m pore size to obtain Y4 ink.

The volume average particle diameter of each ink was determined by dynamic light scattering using a particle diameter measuring apparatus (trade name: UPA15; Microtrack, Inc.). The volume average particle diameter was 13 nm for Y4 ink, 45.6 nm for M4 ink, and 50.8 nm for C4 ink, and the accumulative 90% particle diameter was 13 nm, 85 nm and 89 nm respectively.

Characteristics of the above described black inks and color inks are shown in the following Table 1.

TABLE 1

| | BK1 | BK2 | BK3 | BK4 | BK5 | BK6 |
|---|---|---|---|---|---|---|
| Volume average particle diameter of CB (not less than 50 nm) | 45 | 80 | 120 | 250 | 90 | 125 |
| Surface tension (mN/m) | 45 | 39 | 43 | 44 | 40 | 42 |
| Viscosity (mPa · s) | 3 | 2.1 | 2.2 | 2.8 | 2.2 | 2.8 |

| | C2 | M2 | Y2 | C3 | M3 | Y3 | C4 | M4 | Y4 |
|---|---|---|---|---|---|---|---|---|---|
| Volume average particle diameter of color pigment (not more than 60 nm) | 40 | 45 | 55 | 128 | 183 | 124 | 50.8 | 45.6 | 13 |
| Accumulative 90% particle diameter of volume particle size distribution (not more than 100 nm) | 75 | 90 | 95 | 200 | 330 | 230 | 89 | 85 | 14 |
| Surface tension (mN/m) | 32 | 32 | 32 | 33 | 32 | 33 | 32 | 32 | 34 |
| Viscosity (mPa · s) | 2.3 | 2.3 | 2.4 | 3 | 3.1 | 3.2 | 3 | 3.1 | 3.1 |

<Evaluation>

Inks prepared as mentioned above were evaluated based on methods and criteria as shown below. Here, the print medium is a normal paper manufactured by CANON INC.

"Sedimentation Properties"

Centrifuging was conducted in 5000 rpm for 30 minutes, and the absorbance of the 20 wt % of the supernatant was measured and compared with those of the initial ink.

A; not less than 70%
B; not less than 50%
C; less than 50%

"Optical Density of Image"

Solid patches were printed using the inks to measure optical density of image. Table 2 shows the results.

TABLE 2

|  | Sedimentation property | Optical density of image |
|---|---|---|
| Black ink 1 | A | 1.05 |
| Black ink 2 | A | 1.32 |
| Black ink 3 | B | 1.45 |
| Black ink 4 | C | 1.45 |
| Black ink 5 | A | 1.34 |
| Black ink 6 | B | 1.42 |

"Color Reproduction Range"

Using each ink set, solid patches of Y, M, C, R, G, and B were printed, and the coloring ability was evaluated by visual observation.
AA; very vivid.
A; comparatively vivid.
B; less vivid.
"Water Fastness"

Using each ink set, solid patches of Y, M, C, R, G, and B were printed, and water was dropped onto the printed face using a dropper to evaluate ink running.
A; ink running is in a satisfactory level.
C; severe ink running is observed.
"Light Fastness"

Using each ink set, solid patches of Y, M, C, R, G, and B were printed, and the patches were irradiated with UV for 100 hours by using an ultraviolet irradiation apparatus manufactured by ATLAS Corp. to evaluate fading level using the difference of image density before and after the irradiation ($\Delta E$).
A; $\Delta E$ is less than 10.
B; $\Delta E$ is 10 or more.

The above evaluation results are shown in the following Table 3.

TABLE 3

|  | Sedimentation property | Color reproduction range | Water fastness | Light fastness |
|---|---|---|---|---|
| Color ink set 1 | — | AA | C | B |
| Color ink set 2 | AA | A | A | A |
| Color ink set 3 | A | B | A | A |
| Color ink set 4 | AA | A | A | A |

Examples 1 to 3 and Comparative Examples 1 to 6

The black inks and color ink sets were combined as shown in the following Table 4 to prepare the ink sets of the present invention and comparative ink sets. The following evaluation was conducted to evaluate these ink sets. The results are shown in Table 4.

"Black Color Bleed"

Using these ink sets respectively, a pattern of a fine black line both sides of which were adjoined by color regions were printed, and bleed between the black and color regions was evaluated by visual observation:

A; bleed was in a satisfactory level,
B; bleed was observed a little, and
C; severe bleed was observed.

"Fixation of Underprinting"

To print black characters, underprinting with color ink was carried out before application of black ink. In this case, the shot amount of the color ink was lessened to about 5% of the black ink. Fixation speed of the printed characters was compared between the ink combinations shown in Table 4:

A; no smear was observed when the characters were touched by hand lightly 10 seconds after printing, and
B; slight smear was observed when the characters were touched by hand lightly 10 seconds after printing.

"Print Quality with Underprinting"

To print black characters, underprinting with color ink was carried out before application of black ink. In this case, the shot amount of the color ink was lessened to about 5% of the black ink. Quality of the printed characters was compared between the ink combinations shown in Table 4:

A; printing quality was good.
B; whisker-like blot was observed, quality was slightly unsatisfactory.

"Black Image Unevenness Due to Binary Printing"

Images were formed by one pass binary printing with 10 duty of Y, M, and C color inks, and 60% duty of black ink applied to the same region. The ink combinations are shown in Table 4. Evaluation was carried out according to the following criteria.

A; Image density difference due to binary printing is less than 0.05.
B; Image density difference due to binary printing is not less than 0.05.

The above described evaluation results are shown in the following Table 4.

TABLE 4

|  | Black ink | Color ink | Printing method | Bk-color bleed | Under printing fixation | Under printing quality | Black image density unevenness |
|---|---|---|---|---|---|---|---|
| Example 1 | Black ink 2 | Color ink set 2 | 1 scan delay | A | — | — | — |
| Example 2 | Black ink 5 | Color ink set 4 | 1 pass-binary | A | A | A | A |
| Example 3 | Black ink 6 | Color ink set 2 | 1 pass-binary | A | A | A | A |
| Comparative example 1 | Black ink 2 | Color ink set 1 | 1 scan delay | A | — | — | — |
| Comparative example 2 | Black ink 2 | Color ink set 3 | 1 scan delay | B | — | — | — |
| Comparative example 3 | Black ink 5 | Color ink set 1 | 1 pass-binary | A | A | B | B |
| Comparative example 4 | Black ink 5 | Color ink set 3 | 1 pass-binary | C | B | B | B |
| Comparative example 5 | Black ink 6 | Color ink set 1 | 1 pass-binary | A | A | B | B |
| Comparative example 6 | Black ink 6 | Color ink set 3 | 1 pass-binary | B | B | A | A |

As described above, the present invention provides an ink-jet image excellent in light-, water- and gas-fastness, excellent in edge sharpness and high image density in black image, and excellent in wide color reproduction range of color image, without bleed between different colors.

What is claimed is:

1. An ink set for ink-jet recording comprising an aqueous black ink and an aqueous color ink, wherein the black ink comprises a carbon black as a coloring material having a volume average particle diameter determined by dynamic light scattering of not less than 50 nm, the color ink comprises a pigment as a coloring material having a volume average particle diameter determined by dynamic light scattering of not more than 60 nm, and an accumulative 90% particle diameter of volume particle size distribution of not more than 100 nm, the volume average particle diameter of the carbon black is larger than that the pigment in the color ink, and wherein the surface tension of the black ink is higher than that of the color ink.

2. The ink set according to claim 1, wherein the color ink is selected from the group consisting of a yellow ink, a magenta ink, and a cyan ink.

3. The ink set according to claim 2, wherein the color ink comprises a first magenta ink and a second magenta ink, and the first and second magenta inks are different in concentration of the pigment.

4. The ink set for ink-jet recording according to claim 2, wherein the color ink comprises a first cyan ink and a second cyan ink, and the first and second cyan inks are different in pigment concentration.

5. An ink set for ink-jet recording comprising a black ink, a yellow ink, a magenta ink, and a cyan ink, wherein (a) the black ink comprises at least water and a carbon black, and a volume average particle diameter of the carbon black determined by dynamic light scattering is not less than 50 nm, (b) the yellow, magenta, and cyan inks each comprises at least water and an organic pigment, and a volume average particle diameter of the organic pigment determined by dynamic light scattering is not more than 60 nm, and an accumulative 90% particle diameter of volume particle size distribution is not more than 100 nm, (c) the volume average particle diameter of the carbon black in the black ink is larger than the volume average particle diameter of the organic pigment in each color ink, and the black ink has a higher surface tension than that of the color inks.

6. The ink set according to claim 5, wherein the black ink and the color inks have the same ionicity.

7. The ink set according to claim 6, wherein the ionicity is anionic.

8. The ink set according to claim 7, wherein the black ink has a first ionicity and the color inks have a second ionicity opposite to the first ionicity.

9. The ink set according to claim 8, wherein the fist ionicity is cationic and the second ionicity is anionic.

10. An ink-jet recording method comprising the steps of:
    (i) preparing an ink set according to claim 1;
    (ii) applying the black ink to a recording medium; and
    (iii) applying the color ink to the recording medium.

11. The ink-jet recording method according to claim 10, wherein the black ink has a first ionicity and the color inks have a second ionicity and the first ionicity and the second ionicity are the same.

12. The ink-jet recording method according to claim 11, wherein
    the step (iii) is performed at least one scan after the step (ii) was performed.

13. The ink-jet recording method according to claim 10, wherein the black ink has a different ionicity from that of the color inks.

14. The ink-jet recording method according to claim 10, wherein the steps (ii) and (iii) are performed in one scan operation.

15. An ink-jet recording method comprising the steps of:
    (i) preparing the ink set according to claim 5;
    (ii) applying the black ink to recording medium; and
    (iii) applying the color ink to recording medium.

16. The ink-jet recording method according to claim 15, wherein the black ink has a first ionicity and the color inks have a second ionicity, and the first ionicity and the second ionicity are the same.

17. The ink-jet recording method according to claim 16, wherein the step (iii) is performed at least one scan after the step (ii) was performed.

18. The ink-jet recording method according to claim 15, wherein the black ink has a different ionicity from that of the color inks.

19. The ink-jet recording method according to claim 18, wherein the steps (ii) and (iii) are performed in one scan operation.

20. An ink cartridge comprising a plurality of ink tanks accommodating a black ink and color inks of an ink set according to claim 1 respectively.

21. A recording unit comprising a plurality of ink tanks accommodating a black ink and color inks of an ink set according to claim 1 respectively, and a plurality of ink-jet heads discharging the black ink and the color inks respectively.

22. An ink-jet recording apparatus comprising
    a plurality of ink-tanks accommodating a black ink and color inks of an ink set according to claim 1 respectively,
    a plurality of ink-jet heads discharging the black ink and the color inks respectively.

* * * * *

UNITED STATES PATENT AND TRADEMARK OFFICE
CERTIFICATE OF CORRECTION

PATENT NO. : 6,733,120 B2
DATED : May 11, 2004
INVENTOR(S) : Masashi Ogasawara, et al.

It is certified that error appears in the above-identified patent and that said Letters Patent is hereby corrected as shown below:

Column 1,
Line 46, "a-volume" should read -- a volume --.

Column 2,
Line 60, "plurality-of" should read -- plurality of --.

Column 3,
Line 15, "that that" should read -- than that --.

Column 5,
Line 9, "Clumbia" should read -- Columbian --.
Line 32, "of" should be deleted.

Column 6,
Lines 13 and 56, "above described" should read -- above-described --.

Column 9,
Line 33, "above described" should read -- above-described --.
Line 36, "FIG. 9" should read -- FIG. 9, --.
Line 37, "preferable" should read -- preferable to use --.
Line 44, "weight" should read -- weight, --.

Column 10,
Line 36, "name;" should read -- name: --.

Column 12,
Line 13, "name;" should read -- name: --.

Column 16,
Line 26, "above described" should read -- above-described --

Column 18,
Line 50, "above described" should read -- above-described --.

Column 19,
Line 19, "that" should read -- that of --.

UNITED STATES PATENT AND TRADEMARK OFFICE
CERTIFICATE OF CORRECTION

PATENT NO. : 6,733,120 B2
DATED : May 11, 2004
INVENTOR(S) : Masashi Ogasawara, et al.

It is certified that error appears in the above-identified patent and that said Letters Patent is hereby corrected as shown below:

<u>Column 20,</u>
Line 4, "fist" should read -- first --.
Line 26, "to" should read -- to a --.
Line 27, "to" should read -- to the --.
Line 51, "ink-tanks" should read -- ink tanks --.
Line 53, "respectively," should read -- respectively, and --.

Signed and Sealed this

Thirty-first Day of August, 2004

JON W. DUDAS
*Director of the United States Patent and Trademark Office*